G. J. COOK.
Bucket for Butter and Eggs.

No. 215,576. Patented May 20, 1879.

WITNESSES.
Frank Pardon.
M. F. McKeldin.

INVENTOR.
G. J. Cook
By A. M. Stout atty

UNITED STATES PATENT OFFICE

GEORGE J. COOK, OF LOUISVILLE, KENTUCKY.

IMPROVEMENT IN BUCKETS FOR BUTTER AND EGGS.

Specification forming part of Letters Patent No. 215,576, dated May 20, 1879; application filed March 14, 1879.

*To all whom it may concern:*

Be it known that I, GEORGE J. COOK, of the city of Louisville, county of Jefferson, and State of Kentucky, have invented certain Improvements in Buckets for Butter and Eggs, of which the following is a specification.

My invention relates, in the first place, to the form and construction of a market-bucket for the use of small farmers and other small producers, in hexagonal form, because that form is most convenient to carry and exactly conforms to the shape of the tiers of egg-cells, hereinafter described, and because in that form any sudden movement given to the bucket laterally would be calculated to injure the contents—eggs, for instance—less, because the force would be distributed over the surfaces of three of the sides instead of one, as in the case of a four-sided bucket; and it further relates to providing the bottom of the bucket with circular depressions corresponding in position to the egg-cells, so as to accommodate the lower ends of the eggs in the first tier of egg-cells, and in fastening the top and bottom securely together by means of a center post provided with screw-threads at each end, to enter screw-holes in the centers of the top and bottom, respectively, and in providing the center post with horizontal holes, in which pins may be inserted, in order to separate and confine the trays in their proper positions. The different kinds of articles are confined in the bucket at the same time.

My invention relates, in the second place, to a combination of egg-cells in tiers having the lateral outlines of a hexagon, to correspond to and fit snugly into the bucket hereinbefore described.

My design is, that each egg shall have a separate cell and rest upon one of its ends, upon a sheet of pasteboard placed under each tier, and each cell shall be longer than it is wide, in order to afford spaces for the insertion of the thumb and finger, so that each egg can be easily placed in or removed out of its cell, all of which will be more fully described hereinafter, with reference to the accompanying drawings, in which—

Figure 1:
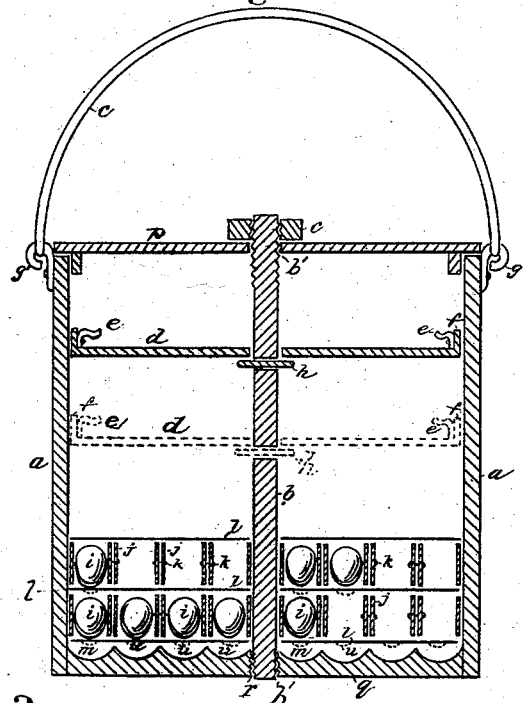
Figure 2:
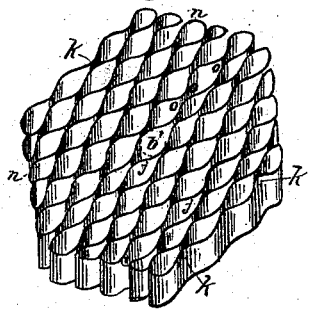

Figure 1 represents a central vertical section of a bucket and two tiers of egg-cells therein, and a thickness of pasteboard between them, and a tray for butter resting on the pin in the center post; Fig. 2, a perspective view from a point above of a tier of egg-cells; and Fig. 3, a like view of the bottom of the bucket, showing the circular depressions in it for the accommodation of the lower ends of the eggs in the lowermost tier.

In the drawings, $a$ represents the body of the bucket; $b$, the center post; $d\ f\ e$, the bottom, sides, and handles of a tray for butter, and $h$ the pin upon which it rests; $q$, the bottom of the bucket, and $m$ the depressions therein, and $p$ the top thereof; $b'$, the screw-hole in the bottom for the center post, $b$; $j$, the egg-cells; $l$, the sheets of pasteboard between the tiers.

Figure 3:
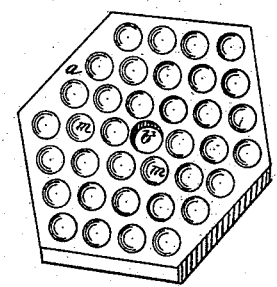

I have found that by describing a single circle, as at $b'$ in Fig. 3, and then describing six other circles of like diameter around it, they will all touch it, and the adjacent ones will touch each other, and that if then another series of circles of like diameter is drawn around the first series, so as to touch the first, the adjoining ones will touch each other and will be twelve in number, and their lateral outline will be six-sided, and of course other series may be added without limit, and the outline will remain the same in form; and my cells, though not perfect circles, yet formed in a tier, assume the same outline.

My egg-cells are made cheaply of pasteboard cut into long strips having the width requisite for the depth of the cells, and then passing them through any simple machine that will bend them laterally into short curves alternately in opposite directions, and then laying the strips on edge alongside of each other, so that their projecting curves shall touch each other, and their receding curves shall with each other form cells for the eggs, as shown in Fig. 2.

The touching curves may be fastened together by cement or by wires or threads $k$.

The cells being oblong in form, spaces are left in each end for the insertion of the thumb and finger.

By means of the screw-fastenings described the body and the top and bottom of the bucket are held securely together, so that its contents cannot be moved vertically or laterally except with the bucket itself.

I am aware that J. T. Cornforth, in his Letters Patent of the United States for improvement in egg and fruit carriers, bearing date August 15, 1871, describes cells constructed in the same manner with my own, hereinbefore described; but their arrangement is quite different, they being placed in frames or boxes square or oblong in form, and in packing a number of them for transportation, one upon another, paper boards are placed between contiguous boxes and between the tiers of cells in the boxes. I do not, therefore, claim, broadly, the egg-cells made of long strips of pasteboard bent as described, with sheets of pasteboard between the tiers of cells; but What I do claim as my invention is—

1. The market-bucket, composed of the body $a$, in six-sided form, the top $p$, bottom $q$, having screw-holes, the center post, $b$, having screw-threaded ends and horizontal holes for pins $h$, adapted to hold tiers of egg-cells or both egg-cells and butter-trays at the same time, substantially as described.

2. The combination of the body $a$ of the described bucket and the described tier of egg-cells, both in the same six-sided form, adapted to and fitting snugly together, substantially as and for the purpose described.

GEORGE J. COOK.

Witnesses:
J. SPEED PEAY,
H. P. STEPHENS.